Dec. 3, 1963  C. W. GERHARDT  3,112,641
APPARATUS FOR MEASURING CORROSION RATES
Original Filed June 9, 1955
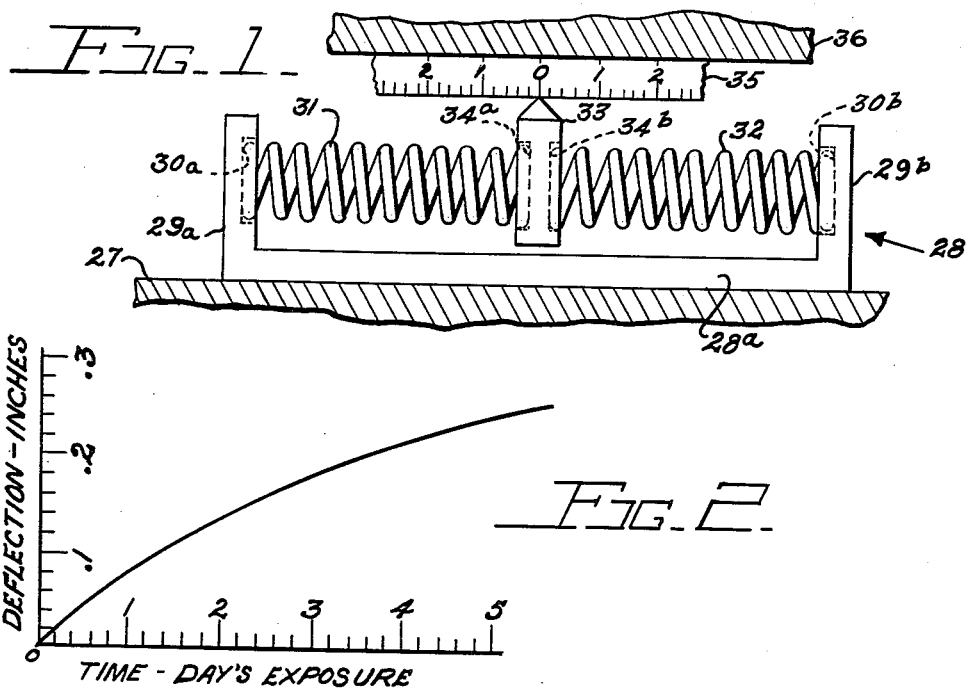
INVENTOR.
CARL W. GERHARDT
BY
ATTORNEYS

United States Patent Office 3,112,641
Patented Dec. 3, 1963

3,112,641
APPARATUS FOR MEASURING
CORROSION RATES
Carl W. Gerhardt, 2945 Dryden Road, Dayton, Ohio
Original application June 9, 1955, Ser. No. 514,408, now
Patent No. 2,972,248, dated Feb. 21, 1961. Divided
and this application Sept. 7, 1960, Ser. No. 54,553
1 Claim. (Cl. 73—86)
(Granted under Title 35, U.S. Code (1952), sec. 266)

The invention described herein may be manufactured and used by or for the United States Government for governmental purposes without payment to me of any royalty thereon.

This invention is a division of my copending application Serial Number 514,408, filed June 9, 1955 which matured into United States Patent No. 2,972,248 and relates to an apparatus for measuring the corrosivity of an atmosphere or environment or for measuring the corrodibility of a resilient member such as a spring. This invention could also be used to measure erosive rates.

The conventional method to measure corrosivity of an environment or the corrodibility of material is to prepare a test sample or samples, put them in a corrosive environment and measure the loss in weight of the samples after a fixed period of time. Such a method requires an extremely accurate balance and it has been necessary to run a large number of samples averaging results to make any reasonably accurate estimation of corrosiveness. There seem to be a number of factors that influence the accuracy of this method including the original preparation of the samples and the handling and preparation of the samples after exposure prior to weighing.

It is an object of this invention to provide an improved apparatus for testing corrosion rates wherein a measurement is made indicative of the change of strength of a resilient member with time as an indication of corrosion rate.

It is another object of this invention to provide an improved apparatus for measuring the corrosivity of an environment or an atmosphere wherein such information is obtained from a measurement indicative of the change of strength with time of the resilient member.

It is a further object of this invention to provide an improved apparatus for measuring the corrosion rate of a resilient material such as a spring wherein such information is obtained from a measurement indicative of the change of strength of the resilient member.

It is yet another object of this invention to provide an improved apparatus for testing erosion rates wherein a measurement is made indicative of the change of strength of a resilient member with time as an indication of the erosion rate.

These and other objects of the invention will become apparent as the detailed description of the invention proceeds.

The invention will be more clearly understood from the following detailed description of specific examples thereof read in conjunction with the accompanying drawing wherein:

FIGURE 1 is an elevational view of an embodiment of my invention; and

FIGURE 2 is a typical graphical presentation of the data obtained from an embodiment of my invention such as is shown in FIGURE 1.

Referring now to the drawing, FIGURE 1 shows an embodiment of my invention. This embodiment has a channel shaped frame 28 which rests on any convenient support 27, e.g., a table. Frame 28 has a base member 28a which supports the support members 29a and 29b in an upright position. Support member 29a has a circular recess 30a therein and support member 29b has a circular recess 30b therein. The openings of these two recesses face each other. A helical spring 31 is rigidly positioned in recess 30a by welding or other suitable means and a helical spring 32 is rigidly positioned in recess 30b in like manner. These springs extend toward each other and are parallel to base member 28a. A pointer 33 having circular recesses 34a and 34b therein is positioned between support members 29a and 29b. Spring 31 is rigidly positioned in recess 34a and spring 32 is rigidly positioned in recess 34b. This arrangement puts both springs in tension pulling against one another through the link medium of pointer 33. The pointer has a sharpened upper end to facilitate reading on scale 35 which is positioned in close relation to pointer 33 and is supported by any suitable support 36. Alternatively springs 31 and 32 may be in compression against each other in which case it will not be necessary to weld or otherwise permanently fix the springs in recesses 30a, 30b, 34a and 34b.

This scale 35 may be rigidly fixed to a permanent support 36 and the apparatus positioned with the pointer opposite the zero position of the scale at the start of a test. One of the springs, e.g., spring 31, must be made of a material which will corrode with a measurable loss of strength with time. The other spring can be made of material or coated in such a fashion that it will have no appreciable loss of strength with time. Or the springs 31 or 32 may be made of different material which will corrode and lose strength at different rates. In any event to get a reading on the scale with time there must be some movement of the pointer from the zero position and this, of course, will be made possible by any one of the methods described above. Data obtained in the use of this apparatus may be plotted for best use in the manner shown in FIGURE 2 or the data may be used directly in estimating corrosivity.

The apparatus of FIGURE 1 when used is placed in the particular environment to which it is to be exposed. The pointer 33 is positioned such that it points to the zero reading on the scale 35. A number of days or weeks or months are allowed to pass and a reading is taken of the new position of the pointer 33 with respect to the fixed scale 35. These readings are normally made at spaced intervals from time to time. Data from these readings may be plotted in a manner similar to that shown in FIGURE 2. A curve somewhat similar to that shown in FIGURE 2 may thus be obtained. This curve is indicative of the corrosiveness of the particular environment or atmosphere in which the apparatus has been placed and of the relative corrodibility of springs 31 and 32. Obviously the apparatus may be used to test either the environment or the springs or both. The springs are usually fabricated from a material which will show a measurable change in compressive strength with time in the corrosive environment.

Although the invention has been described in terms of specified apparatus which is set forth in considerable detail, it should be understood that this is by way of illustration only and that the invention is not necessarily limited thereto, since alternative embodiments and operating techniques will become apaprent to those skilled in the art in view of the disclosure. For example, the various embodiments of the invention can be used in the determination of erosive rates as well as corrosive rates, i.e., to determine the erosiveness of an environment or atmosphere or the erodibility of a resilient member. The resilient member would be made of suitable erodible material for measuring the erosiveness of an atmosphere or environment, and in many cases this material could be the same material as would be used for corrosive rate measurements. The fact that a resilient member made of the same material can in many cases be used to measure both corrosive rates and erosive rates is fortunate since sometimes an environment or atmosphere will have both corrosive and erosive properties. Accordingly, modifications are contemplated which may be made without departing from the spirit of the described invention or of the scope of the appended claim.

What is claimed is:

A corrosion rate measuring apparatus comprising a base, a first support member extending from said base, a second support member spaced from and opposed to said first member and extending from said base, a first corrodible helical spring rigidly attached to said first member and extending toward said second member, said first spring being made of such material that it will lose measurable tensile strength when positioned in an environment corrosive to said first spring, a second helical spring which will lose tensile strength at a slower rate by corrosion than said first spring attached rigidly to said second member and extending toward said first member, a pointer rigidly attached to the free-ends of said springs, a calibrated reference means cooperating with said pointer to indicate the extent of linear movement of said pointer, said springs being placed in tension opposed to each other, and measurements being made at spaced time intervals of the relative position of said pointer to give an indication of the comparative corrosion rate of said first and second helical springs.

References Cited in the file of this patent

UNITED STATES PATENTS 2,784,588   Humble et al. _____ Mar. 12, 1957

OTHER REFERENCES

Article "Properties of Gas Welds in Three Alloys of Sheet Magnesium," by W. H. Jones, Product Engineering, September 1945, pages 580, 581.

"Corrosion Testing Procedures," by F. A. Champion, Chapman & Hall (London), 1952, pages 140, 141, 14 applied.